US006563424B1

(12) United States Patent
Kaario

(10) Patent No.: US 6,563,424 B1
(45) Date of Patent: May 13, 2003

(54) SMART GARMENT SYSTEM, METHOD AND APPARATUS INVOLVED FOR INTEGRATING ELECTRONIC DEVICES INTO GARMENTS

(75) Inventor: Juha Kaario, Tampere (FI)

(73) Assignee: Nokia Corporation, Espoo (FI)

( * ) Notice: Subject to any disclaimer, the term of this patent is extended or adjusted under 35 U.S.C. 154(b) by 22 days.

(21) Appl. No.: 09/861,766

(22) Filed: May 22, 2001

(51) Int. Cl.$^7$ ............................................... G08B 13/14
(52) U.S. Cl. ...................... 340/572.1; 361/683; 361/686
(58) Field of Search .................. 340/572.1; 361/679, 361/683, 685, 686

(56) References Cited

U.S. PATENT DOCUMENTS

| | | | | |
|---|---|---|---|---|
| 5,555,490 A | * | 9/1996 | Carroll | 361/686 |
| 5,798,907 A | * | 8/1998 | Janik | 361/683 |
| 6,249,427 B1 | * | 6/2001 | Carroll | 361/683 |
| 6,319,015 B1 | * | 11/2001 | Faunce | 439/37 |
| 6,324,053 B1 | * | 11/2001 | Kamijo | 361/683 |
| 6,356,437 B1 | * | 3/2002 | Mitchell et al. | 361/683 |

* cited by examiner

Primary Examiner—John Tweel
(74) Attorney, Agent, or Firm—Antonelli, Terry, Stout & Kraus, LLP

(57) ABSTRACT

The invention involves a smart garment system that includes a passive communications system within the garment. The passive communications system provides the garment with circuitry for coupling multiple locations in the garment where electronic devices may be attached. Snap button connectors having first and second portions are provided. Each location includes a second portion of a snap button connector. Information transmitting/receiving units are connected to a first portion of the snap button connector. A second portion of the snap button connector at each location is simultaneously secured to fabric of the garment and coupled to the passive communication system for delivery of information from a transmitting/receiving unit at different locations via mating first and second portions of the snap button connector. The passive communications system includes a controller that senses when a pair of information transmitting/receiving units is simultaneously coupled via snap button connectors at different locations to the passive communications system.

38 Claims, 5 Drawing Sheets

SMART GARMENT SYSTEM, METHOD AND APPARATUS INVOLVED FOR INTEGRATING ELECTRONIC DEVICES INTO GARMENTS

FIELD OF THE INVENTION

This invention relates to wearable electronic devices and smart garments, and more specifically to a smart garment system that allows electronic devices to be secured to the garment at different garment locations.

BACKGROUND OF THE INVENTION

In the recent past a host of new developments involving electronic devices that are secured to garments have spawned a family of descriptive phrases intended to describe this new relationship between electronic devices and the clothing. Some of these phrases include such terms as "intelligent clothing", "smart fabrics", "smart garments", "smart clothing", "wearable computers subsystems" and "wearable computers". There are those who have suggested that the entire field is best described as "fashion technology". The imagination of writers for popular publications is filled with suggestions of what the future will hold for wearable electronic devices. For example, it has been suggested that jackets could be designed that would incorporate a cell phone and a Sony MP3 music player into its lining, along with earphones and a microphone in a collar. Still others put forward the idea of producing a mobile phone that can be incorporated into a jacket button. For some time now individuals that wanted to carry on their person a computer or other electronic device, simply would fashion a vest or belt on to which would be sewn physical structures that allow the devices to be attached mechanically to the vest or belt. Wiring interconnecting the devices would be sewn into the lining of the vest or belt material.

It is important to recognize that these suggestions for Integrating technology and fashion are simply suggestions that do not include practical means and mechanisms that will allow the ideas contained in the suggestions to become practical realities.

SUMMARY OF THE INVENTION

Generally the present invention is directed to a practical as well as advantageous smart garment system that includes a passive communication system within the garment. The passive communication system provides the garment with circuitry for coupling multiple locations in the garment where electronic devices may be attached. Some of these locations include pockets in the garment as well as fastening buttons or zipper fasteners. The buttons may also be decorative and function as a mechanism for securing electronic devices to the garment.

Snap button connectors are provided that have a first portion separable from a mating second portion. Each garment location includes a second portion of a snap button connector and an information transmitting/receiving unit is connected to a first portion of a snap button connector. The second portion of the snap button connector at each location is simultaneously secured to the fabric of the garment and coupled to the communications system for delivery of information from a transmitting/receiving unit via mating first and second portion of a snap button connector and the passive communications system to another unit secured to the communication system by a snap button connector at another garment location.

The passive communications system includes a controller in signal communication with the second portion of a snap button connector at each of the different locations on the garment and each one of the pair of information transmitting units are connectable to anyone of the second portions of the snap button connectors.

The controller senses when a pair of information transmitting/receiving units are simultaneously coupled via a snap button connector at different locations to the passive communication system. The controller then provides a signal path between the units for the simultaneous connection of the units to each other.

In the smart garment system the first portion of the snap button connector may also be secured to the fabric such that when the first and second portions are in mating engagement, the fabric secured to the first and second portions are physically coupled via the first and second portion of the snap button connector.

In a preferred embodiment of the invention the first portion of the snap button connector is of a female type and is comprised of a planar first pole element separated by a layer of insulation from a second planar pole element. The layer of insulation and second planar pole element each have an opening there through coincident with each other to provide access to the planar first pole element and thereby create a female type connector.

The second portion of the snap button connector is of the male type and is comprised of a vertically disposed first pole element integral with a planar base. A collar of insulation surrounds the perpendicular first pole element. The planar base of the vertical first pole element is separated by a layer of insulation from a second planar pole element. The layer of insulation and second planar pole element each have an opening there through coincident with each other to thereby allow the vertically disposed first pole element and surrounding collar of insulation to pass through the opening in the layer of insulation and the second planar pole element and then beyond the second planar pole element to thereby create a male-type connector.

In a preferred embodiment of the invention the planar first pole element, layer of insulation and second planar pole element each have an overall shape of a disk. In a similar manner the planar base of the first pole element, the layer of insulation and the second planar pole element, each have an overall shape of a disk. And furthermore the disk shaped first pole element may be provided with a decorative layer of material that generally matches the external appearance of other garment buttons elsewhere on the garment.

According to the present invention a method of establishing communication between wearable electronic devices coupled to a smart garment communication system is provided where the smart garment includes a plurality of garment locations at which locations communication system connectors allow any two electronic devices at any two locations to be coupled to the system and interconnected via the system The method entails steps of first sensing which communications systems connectors have electronic devices coupled thereto, and then providing a circuit path via the communications system to interconnect the electronic devices.

A primary advantage/objective of this invention resides in providing on a smart garment multiple garment locations at which locations pairs of electronic devices may be secured to the garment and coupled to each other by a communications system integrated into the fabric of the garment.

Another advantage/objective of this invention resides in the provision of a smart garment system that includes a communications system in the fabric of the garment that passively senses when a pair of electronic devices is connected to the garment's communications system and provides a signal communication path between the devices.

Yet another advantage/objective of the invention resides in the provision of a snap button connector that may be employed with a smart garment to connect electronic devices to a communication system integrated in the garment.

Still yet another advantage/objective of the invention resides in the provision of a snap button circuit connector that will have a decorative appearance that matches other fabric fasteners on a smart garment.

A further advantage/objective of the invention resides in a method of sensing when a smart garment's communications connectors have electronic devices coupled thereto and then providing a circuit path via a communications system to interconnect the electronic devices.

Another advantage/objective of the invention resides in integration of a communications system in the fabric of a smart garment such that the garment may be laundered in a conventional manner.

A more specific advantage/objective of the invention resides in the provision of a smart garment that may easily store a mobile phone in any of a number of open or closed pocket locations on the garment while simultaneously allowing a headset for the mobile phone to be connected to the phone at another location on the garment such as a collar or lapel.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

This application shares a common assignee and is closely related to corresponding U.S. patent application, Ser. No. 09/750,719, filed Jan. 2, 2001, and titled System and Method for Smart Clothing and and Wearable Electronic Devices.

Figure 1:
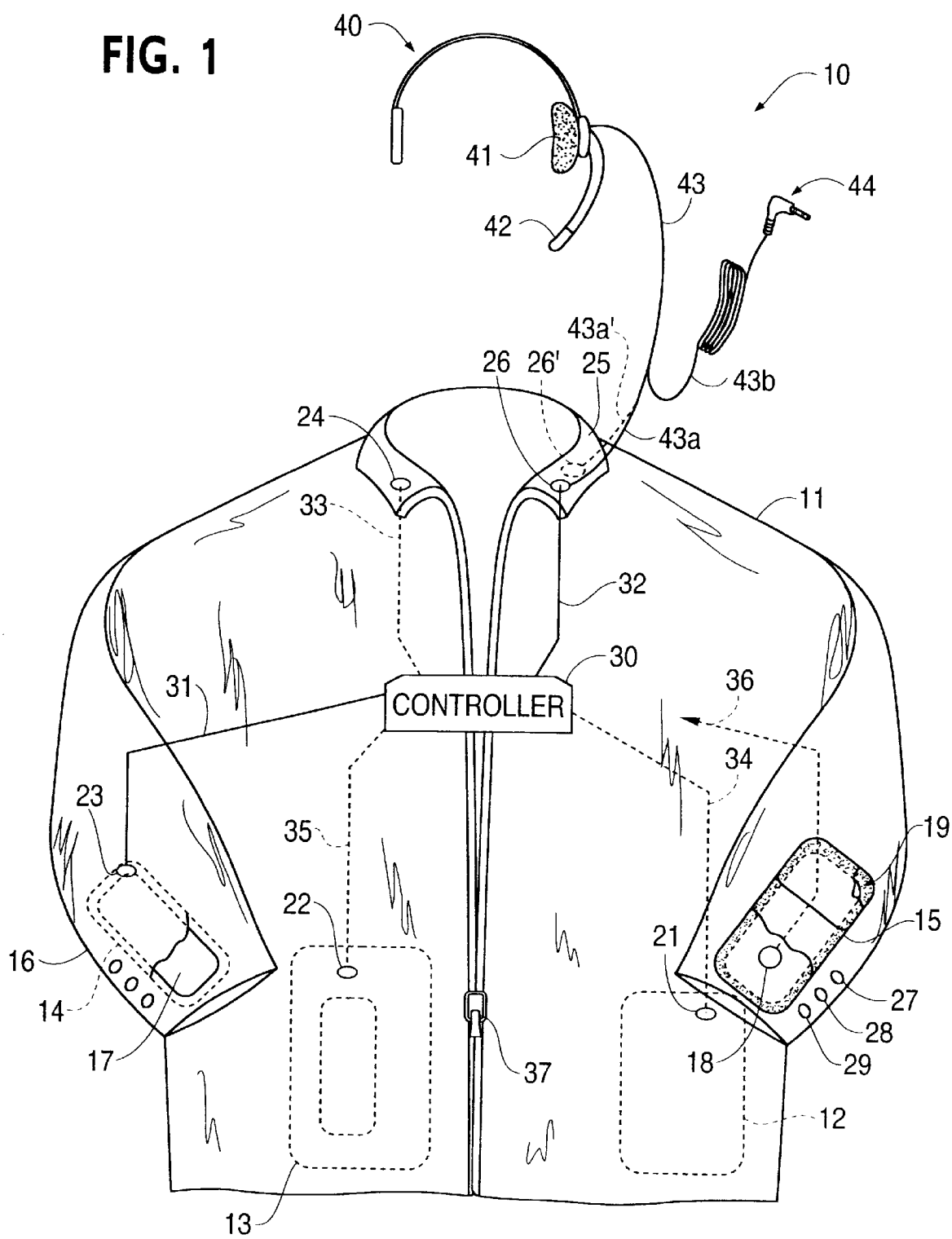
FIG. 1 illustrates schematically a smart garment system that embodies the invention.

Reference is now made to FIG. 1, which illustrates major components of a preferred embodiment of a smart garment system 10. A smart garment 11 is provided with a number of pockets 12, 13, and 14, which are shown in dotted outline on the garment 11. A detachable pocket 15 is shown secured to a garment sleeve by a Velcro like fastener 19. An inside lining of the pocket 15 includes an opening 18 through which a fastener, not shown, may be located. Although not shown, it is to be understood that the detachable pocket 15 is adapted for storage of an electronic device and is provided with a signal passing connector of a type to be more fully described herein after. The garment 11 is provided with fasteners at locations 21, 22, and 23 in pockets 12, 13, and 14. Each location is provided with one portion of a fastener. In the preferred embodiment of the invention snap type fastener connectors are employed. The invention also embraces the use of standard electrical circuit connectors common in the prior art. In this application, however the fastener connectors will be called snap fasteners. This designation is not intended to limit in any way the broad nature of the invention as defined in the appended claims. Accordingly, snap fastener connectors at locations 24 and 26 are shown located in collar 25 of the garment. In the practice of the invention, garment snap fastener connector locations may be situated in the lapel of the garment as well as any location on the garment where an electronic device is to be connected to and integrated into the smart garment system. That snap fastener connectors at locations 21, 22, 23, 24 and 26 are coupled in signal communication via cable's 31, 32, 33, 34 and 35 to a controller 30 here shown schematically on the garment 11. Note that a cable 36 shown in broken line is depicted traveling from the region of the connector opening 18 towards the controller 30. In the event that a detachable pocket is included in the smart garment 11 the structure and operation of the controller 30 would be modified to include an additional port to accommodate cable 36. In the practice of the invention the controller 30 is integrated in the fabric of the garment 11.

The pocket 14 in sleeve 16 of the garment 11 is shown with an outside portion of the pocket removed to reveal an electronic device 17 of the type capable of receiving and transmitting information. In this preferred embodiment of the invention the electronic device is a mobile phone handset. The cables 31, 32, 33, 34 and 35 are connected to the controller 30 in a star like array. This star like array of cables 31, 32, 33, 34, 35 and the controller 30 constitute a communications system in the garment 11. The role and function of the controller 30 in the smart garment communication system will be explained in more detail hereinafter.

Figure 2:
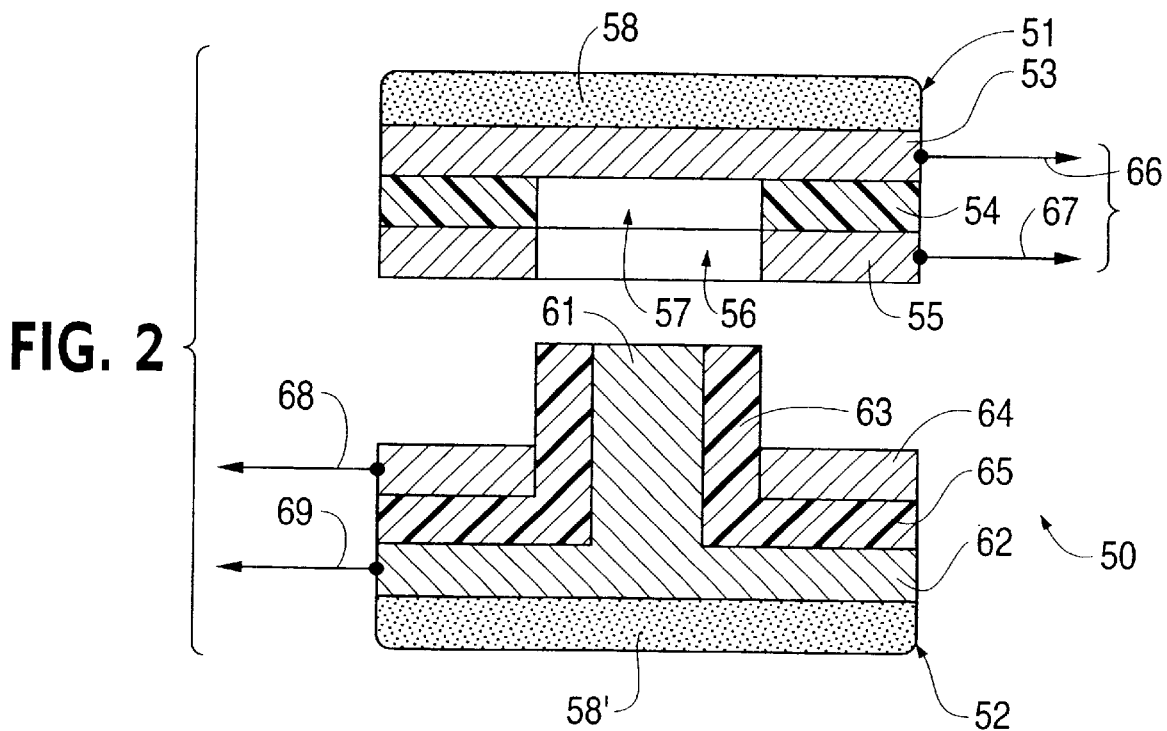
FIG. 2 depicts separate male and female portions of a snap fastener with a two pole conductive capability.

An electronic device 40 here shown in the preferred embodiment as a mobile phone headset is equipped with earphone 41 and microphone 42 both of which are conventional in their design and operation. A headset cable 43 is connected to a headset cable extension 43a, which leads to the snap fastener connector at garment location 26 whereas a headset cable extension 43b is shown terminating in a standard headset connector 44. The garment is provided with a zipper fastener 37 of the type which includes two sets of interlocking teeth of the same designed to provide a continuous closure for adjacent pieces of garment fabric. Reference is now made to FIG. 2, which generally depicts separate male and female portions of a snap fastener with two pole conductive capabilities. More specifically FIG. 2 depicts a snap button connector 50 that is comprised of a female snap button connector first portion 51 and a mating snap button connector second portion 52. The female snap button connector first portion 51 includes a planar first pole element 53 separated by layer insulation 54 from a planar second pole element 55. The layer of insulation 54 and a planar second pole element 55 have openings 56, 57 there through that are coincided with each other to provide a female opening and provide access to the planar first pole element 53. A decorative layer of material 58 is shown secured to the top of the female snap button connector first portion 51. The decorative layer 58 may be selected to generally match in appearance other buttons, such as decorative buttons 27,28, and 29 on the garment. The just described arrangement creates a female type connector.

Attention is now direct to a second portion of the male snap button connector 52 of FIG. 2. The portion 52 is comprised of a perpendicularly disposed first pole element 61 integral with a planar base 62. A collar of insulation 63 is shown surrounds the perpendicular first pole element 61. The planar base 62 of the perpendicular pole element 61 is separated by layer of insulation 65 from a second planar pole element 64. The collar of insulation 63 and the layer of insulation 65 may be formed as a unitary structure as is shown in FIG. 2. The layer of insulation 65 and the second planar pole element 64 are configured to cooperate with each other such that the perpendicular first pole element 61 and surrounding collar 63 pass through the second planar pole element 64 and then beyond the second planar pole element 64 to create and male member of the connector. Electrical leads or cables 66 and 67 are connected to the planar first pole element 53 and planar second pole element 55 of female snap button connector first portion 51. In a like manner the male snap button connector mating male second portion 52 includes electrical leads or cables 68, 69 connected to the second planar pole element 64 and a planar base 62 of the first pole element 61.

Figure 3:
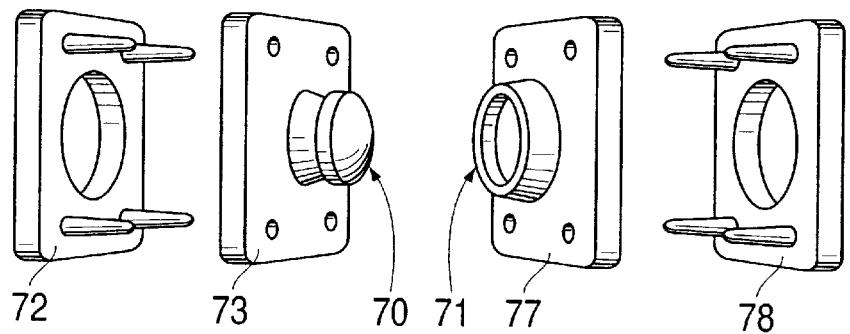
FIG. 3 is a prior art illustration of a mechanical snap button connector of the type employed in clothing.

Turning now to FIG. 3 which exemplifies the basic nature of the construction of a prior art snap button connector of the type used to join separate fabrics together. On the left-hand side of FIG. 3 a cap 72 and a stud 73 are shown separated from each other. Although not shown in FIG. 3 it is to be understood that a layer of fabric not shown would be interposed between the cap 72 and a stud 73. When the cap and stud 72,73 are forced together into a unitary arrangement there would exist a male portion of a snap button secured to the fabric. A male member 70 is formed integrally on the stud 73. In a similar fashion on the right hand side of FIG. 3 a socket 77 with its female opening 71 and its associated cap 78 are shown. The socket and cap 77,78 may also have fabric secured between them The "snap" nature of the arrangement derives from the insertion of the enlarged end portion of the male member into a somewhat smaller female opening 71 in the "socket". Because the male member has a somewhat enlarged end, the enlarged end when forced into the opening 71 will snap in place. For purpose of explanation only in FIG. 2 the male and female portions are shown to have a uniform diametrical configuration. It is to be understood that the invention embraces the idea of including a variety of mating configurations that will enhance the snap together nature of the snap fastener two pole conductive connector that embodies the invention.

Figure 4:
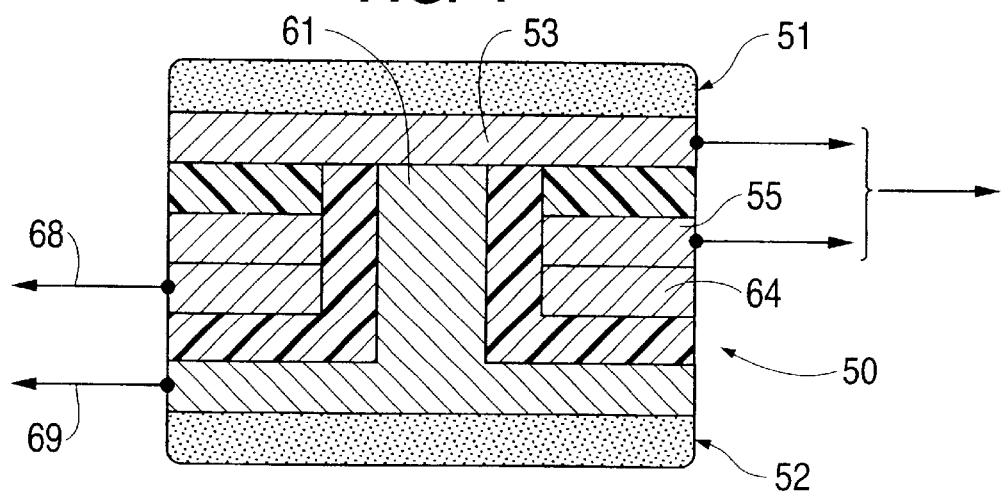
FIG. 4 is a snap fastener with male and female portion shown in mating engagement to provide a two pole conductive connection.

In FIG. 4 the snap button fastener connector 50 of FIG. 2 is shown with female and male first and second portions 51 and 52 in mating engagement to provide a two pole conductive connection. When the first and second portions 51, 52 are brought into mating engagement the planar first pole element 53 of first portion 51 comes into electrical conductive contact with a perpendicularly disposed first pole element 61 of the second portion 52. In a similar manner the planar second pole element 55 of the first portion 51 comes into electrically conductive contact within second planar pole element 64 of the second portion 52.

Figure 5:
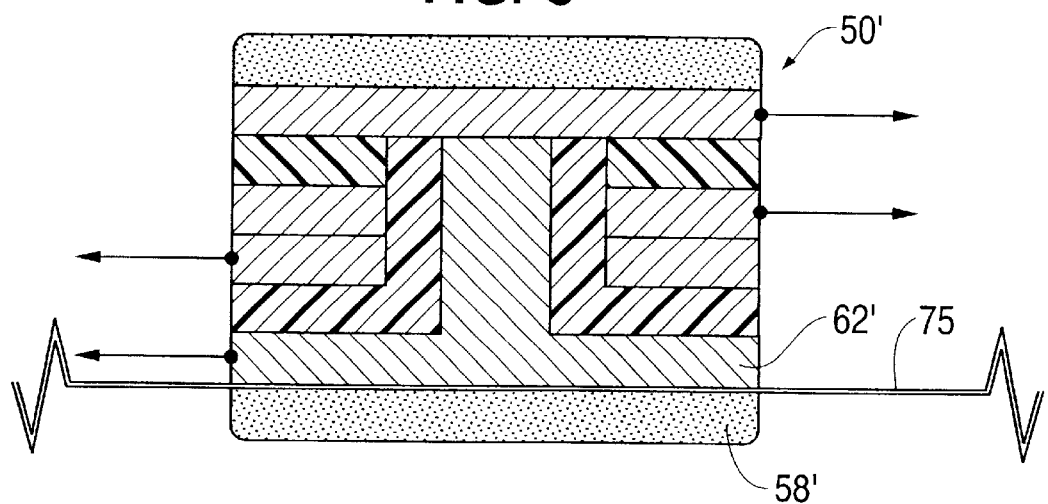
FIG. 5 is a snap fastener with male and female portion shown in mating engagement as shown in FIG. 4 with the male portion secured to fabric of a garment.

FIG. 5 depicts a snap button connector 50 previously described in conjunction with the explanation of FIGS. 2 and 4, wherein the snap button connector 50' includes a showing of garment fabric 75 integrally secured between the planar base 62' and a decorative layer 58'. Any of a number of state-of-the-art techniques may be employed in securing the garment fabric 75 between the planar base 62' and the decorative layer 58'. Any suitable adhesive that is compatible with the fabric and the snap button materials may be employed.

Figure 6:
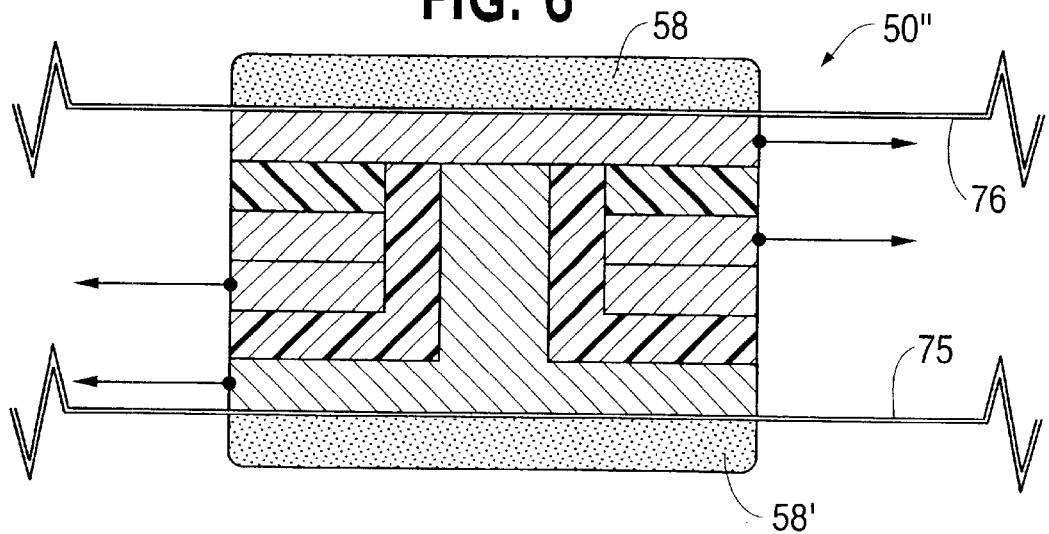
FIG. 6 is a snap fastener of the type shown in FIGS. 4 and 5 with both male and female portions of the snap fastener secured to fabric of a garment.
Figure 7:
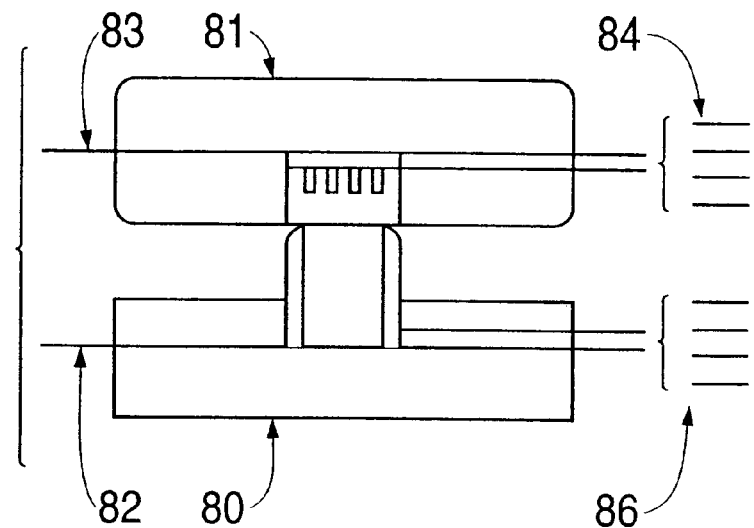
FIG. 7 is a schematic illustration of a snap fastener with an embedded 4 pole electrical connector.

In FIG. 6 the snap button connector 50" differs from that which has been shown and described in FIG. 5 in that the snap button connector 50" is additionally secured to the garment fabric 76 in the same manner as garment fabric 75 is connected to snap button connector just described in FIG. 5. When the planar first pole element 53, layer of insulation 54, second planar pole element 55, as well as the planar base 62, second planar pole element 64 and layer insulation 65 all have an overall disk shape the snap button takes on an overall appearance that draws no attention to the snap fastener connector. In other words the snap fastener connector does not detract from the general appearance of the garment. By way of summary it will be noted that in FIG. 1 the smart garment system may include a headset 40 that contains an earphone 41 and a microphone 42. Headset 40 is shown connected to a snap fastener at garment location 26 via headset cables 43, 43a. Although not shown in FIG. 1 it is well known that the earphone and microphone would each require a pair of electrical leads or cables that would exist in the headset cable 43, 43a. It therefore follows that a pair of two pole snap fasteners would be required to accommodate the earphone 41 and microphone 42 of the headset 40. It is for this reason that there is shown in FIG. 1 in dotted outline a second snap fastener 26' located on the collar 25. A single four-pole connector of the nature schematically illustrated in FIG. 7 could be used in place of a pair of two pole conductive connectors just described. The four pole conductive connector of FIG. 7 has a male portion 80 and a female portion 81. Fabric layers 82, 83 are shown as well. Electrical leads 84 and 86 are shown exiting the male and female portions of the four pole conductive connector.

Figure 8:
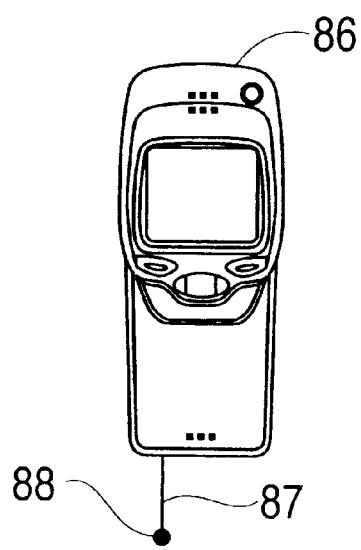
FIG. 8 illustrates a mobile phone handset with an attached snap fastener connector.
Figure 9:
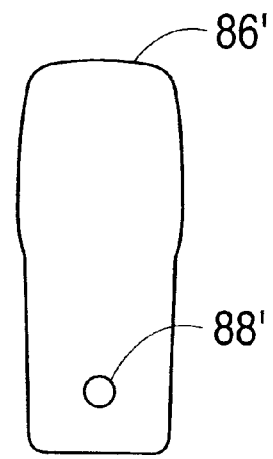
FIG. 9 shows a mobile phone with a snap fastener integrated into the mobile phone.

FIG. 8 illustrates the mobile phone handset 86 attached by a cable 87 to one portion of snap fastener connector 88. Another embodiment of the invention is shown in FIG. 9 where handset 86' includes one portion of snap fastener 88 integrated directly into the handset 86.

Figure 10:
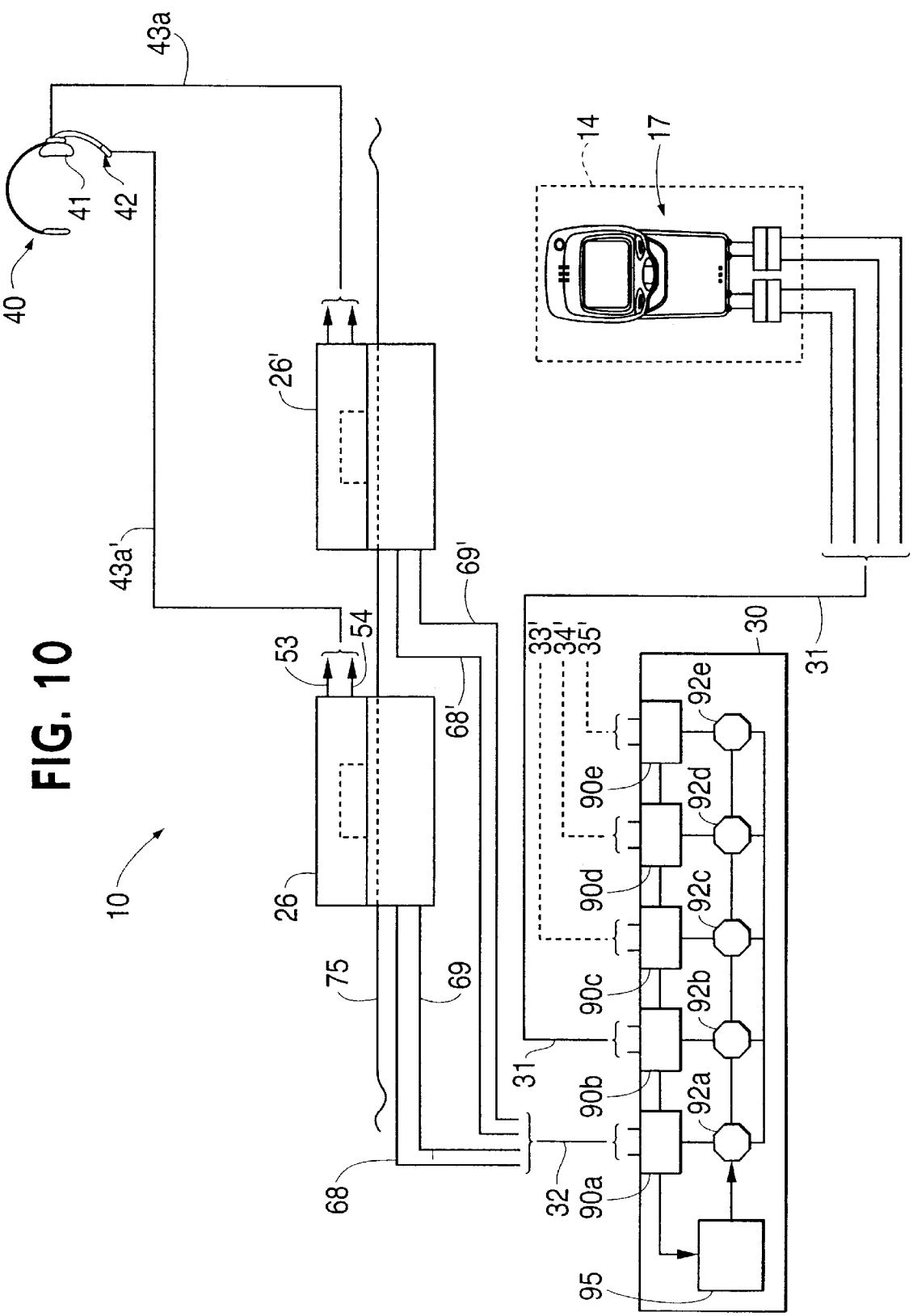
FIG. 10 illustrates an embodiment of the smart garment system wherein a pair of snap fasteners each providing a two pole conductive connection are employed in the system.

FIG. 10 illustrates an embodiment of the invention wherein a pair of snap fasteners 26 and 26' as depicted in FIG. 1, described in FIG. 2, and specifically shown in FIG. 5, is integrated into a smart garment system 10. A mobile phone 17 in garment pocket 14 and a headset 40 with an earphone 41 and microphone 42 are connected as shown via the cables 43a and 43a' to the two pole snap fasteners 26' and 26. The snap fastener connectors 26 and 26' are in turn connected to the controller 30 via pairs of cables 68, 69 and 68', 69' that make up conductive cable 32 of FIG. 1. The handset mobile phone 17 is also coupled to the controller 30 via a pair of unreferenced two pole conductive fasteners in the garment pocket 14 via pairs of unreference cables that make up conductive cable 31 as shown in FIG. 1. From the foregoing description of FIG. 10 it is apparent that the embodiment of the invention includes a portion of the smart garment system FIG. 1 wherein a pair of snap fastener connectors 26, 26' each providing a two pole conductive connection are employed. A single garment location in pocket 14 is provided to store an electronic device of the type that can transmit and receive information. In this preferred embodiment the electronic device is a handset mobile phone 17. A controller 30 is integrally secured to the garment by means not shown and is electrically connected via conductive fibers i.e. cables to two pole snap fastener connectors 26, 26' secured to the garment at a garment location such as the collar of the garment. It follows from the previous description that a portion of the each snap fastener electrical connector 26', 26 is connected to the headset 40 as previously described. The controller 30 is passive in nature and functions as a logic circuit to allow the unreferenced snap fastener two pole conductive connectors of the mobile phone 17 in the pocket 14 to be interconnected when the mobile phone 17 is connected to the unreferenced snap fastener two pole conductive connectors and the headset 40 is connected to the snap fastener two pole conductive connectors 26, 26'. The controller 30 senses which snap fastener connectors are being used and opens a connection between the connectors in a first to serve basis.

The invention therefore is comprised of the smart garment and a smart garment system that includes wearable electronic devices as shown in FIG. 1. The smart garment system further includes what may be considered a subsystem, which may be designated a communication system that is included in fabric of the garment.

The communication system includes a controller 30, which is in signal communication via a cable network i.e. 31, 32, 33, 34, and 35 with a portion of the snap fastener connector at each of the different garment locations. As has been noted earlier, each one of a pair of electronic devices is connectable to any one of the snap fastener connector portions at the various garment locations. The controller 30 senses when a pair of electronic devices are simultaneously coupled via the snap fastener connectors of the communication system The controller 30 functions in a passive manner and thereby provides a signal path via the cable network to simultaneously connected each of the electronic devices to each other.

More specifically, the controller 30 illustrates a high-level diagram of how the controller works. At the outset it should be understood that the controller 30 might be passive i.e. using power from a battery in an electronic device such as a mobile phone or from an external battery not shown. The controller includes circuit connectors 90a, 90b, 90c, 90d, and 90e that are each provided with a circuit to measure power level or to detect an ID code of a device that is attached. For example, conductive cable or fiber 32 from the headset 40 is attached to circuit connector 90a, and the mobile phone 17 is attached by cable 32 to circuit connector 90b. Because FIG. 1 is intended to depict a preferred embodiment of the invention all conductive cables or fibers involved in the operation of the preferred embodiment are shown in full line. In order, however to show the presence of other possible arrangements of electronic devices coupled to the garment 11 (FIG. 1) there are also shown other possible conductive cable or fiber arrangements connecting other combinations of electronic devices at different garment locations depicted in FIG. 1. These other possible conductive cables or fibers are shown in broken line and are identified as 33', 34', 35', and are shown emanating from connector circuits 90c, 90d, and 90e which function in the same manner as connector circuit 90a described above. The controller 30 also includes a controller circuit 95 and a plurality of switches 92a, 92b, 92c, 92d and 92e interconnected as shown in FIG. 10. The switches 92a through 92e function to enable/disable a connection from connector circuits 90a through 92e. The controller circuit 95 operates to keep track of the status of connector circuits 90a through 92e. The controller circuit 95 has a simple logic program that will enable only one electronic device such as a mobile phone or battery power input and one or more headset components. In case of error all the switches 92a through 92e are disabled.

In summary the controller 30 functions in the following manner. When a device is connected at a garment connector location and thus to the controller 30, the controller 30 detects whether there is current or not. If there is no current, there will be no operation. Generally speaking, at the time a first power enable device is connected at a garment connector location and a minimum current is delivered to the logic circuit in the controller circuit 95, the logic circuit is activated and interrogates the connected device to determine what kind of devices are connected to the connector circuits 90a–90e and determines if they are compatible. In the event that there are two power enable devices connected at connector locations the controller 95 will disable the operation of the controller 30 as a whole. It is to be understood that the overall function of the controller 30 will depend upon the programming of the logic and what kind of devices are to be connected to the communication system of which the controller 30 is a part. The nature of this programming could allow, for example, one mobile phone, an external microphone and one or two headset elements (mono/stereo). As noted earlier the controller 30 determines in nature of a device connected at garment connector locations to the controller 30 by means of measuring typical voltage/current levels or by means of an ID code. FIG. 10 illustrates an example of a controller 30 that has five (5) ports or connectors 90a through 92e. It is to be understood that while the embodiment of the invention shown in FIGS. 1 and 10 is directed to a five-(5) port/connector arrangement, there can be basically any number of ports/connectors, although practical usage limits the variations.

From the foregoing description of the smart garment system and passive communication system included within the garment it will be appreciated that the invention inherently includes in its broadest sense a method of providing communication between wearable electronic devices coupled to a smart garment communication system where a smart garment is provided with a plurality of garment locations at which locations communication system connectors are provided. The communication system allows electronic devices at any two locations to be coupled to the system and interconnected via the system The method is comprised of (a) sensing which communication system connectors have electronic devices coupled thereto, and (b) providing a circuit path via the communication system to interconnect the electronic devices. The method invention in a more complete sense involves a method comprised of the following steps: (a) sensing when communications system connectors have electronic devices connected thereto and at least one connector is provided with a source of power, (b) activating a logic circuit that functions to interrogate the nature of each device connected to a connector to determine communication system compatibility, (c) providing a circuit path via the communications system to interconnect the electronic devices if the devices are compatible, and (d) disabling the communication system if there are any incompatible electronic devices connected to the communications system Although the present invention has been described herein with reference to a particular method, materials and embodiments, the present invention is not intended to be limited to the particulars disclosed herein, rather, the present invention extends to all functionally equivalent and structures, methods and uses, such as are within the scope of the appended claims.

What is claimed is:

1. A method of providing communication between wearable electronic devices coupled to a smart garment communication system where the smart garment is provided with a plurality of garment locations at which locations communication system connectors are provided to allow electronic devices to be coupled to the system and interconnected via the system, the method comprising the steps of:

sensing which communication systems connectors have electronic devices coupled thereto, and providing a circuit path via the communications system to interconnect the electronic devices.

2. A method of providing communication between wearable electronic devices coupled to a smart garment communication system where the smart garment is provided with a plurality of garment locations at which locations communication system connectors are provided to allow electronic devices to be coupled to the system and interconnected via the system, the method comprising the steps of:

sensing when communications system connectors have electronic devices connected thereto and at least one connector is provided with a source of power, and providing a circuit path via the communications system to interconnect the electronic devices.

3. A method of providing communication between wearable electronic devices coupled to a smart garment communication system where the smart garment is provided with a plurality of garment locations at which locations communication system connectors are provided to allow electronic devices to be coupled to the system and interconnected via the system, the method comprising the steps of:

sensing when communications system connectors have electronic devices connected thereto and at least one connector is provided with a source of power, activating a logic circuit that functions to interrogate the nature of each device connected to a connector to determine compatibility, and providing a circuit path via the communications system to interconnect the electronic devices if the devices are compatible.

4. A method of providing communication between wearable electronic devices coupled to a smart garment communication system where the smart garment is provided with a plurality of garment locations at which locations communication system connectors are provided to allow electronic devices to be coupled to the system and interconnected via the system, the method comprising the steps of:

sensing when communications system connectors have electronic devices connected thereto and at least one connector is provided with a source of power, activating a logic circuit that functions to interrogate the nature of each device connected to a connector to determine communication system compatibility, providing a circuit path via the communications system to interconnect the electronic devices if the devices are compatible, and disabling the communication system if there are any incompatible electronic devices connected to the communications system.

5. A smart garment for use with wearable electronic devices of the type that include a pair of information transmitting and receiving units that may be separately worn with a garment at different locations on the garment, the smart garment including in combination:

a controller in signal communication with signal passing connectors at each of the different locations on the garment, each one of the pair of information transmitting and receiving units are connectable to anyone of the signal passing connectors at each of the different locations, the controller senses when a pair of information transmitting and receiving units are simultaneously coupled to a signal passing connector at different locations, the controller providing a signal path between the units when a simultaneous connection of the units to the signal passing connectors is sensed.

6. The smart garment of claim 5 wherein the garment locations are in conventional garment pockets.

7. The smart garment of claim 5 wherein the garment includes sleeves that have pockets that serve as garment locations.

8. The smart garment of claim 5 wherein the garment is provided with a detachable garment pocket that is adapted for storage of an electronic device and is provided with a connector suitable for connection to one of the signal passing connectors at a garment location.

9. A smart garment for use with wearable electronic devices of the type that include a pair of information transmitting and receiving units that may be separately worn with a garment at different locations on the garment, the smart garment including in combination:

a passive controller electrically coupled to electrical connectors at each of the different locations on the garment, each one of the pair of information transmitting and receiving units are electrically connectable to anyone of the electrical connectors at each of the different locations, the passive controller senses when a pair of information transmitting units are simultaneously electrically coupled to electrical connectors at different locations, the passive controller providing an electrical path between the units when a simultaneous connection of the units to the electrical connectors is sensed.

10. The smart garment of claim 9 wherein some of the different locations on the garment are in garment pockets.

11. The smart garment of claim 10 wherein some of the different locations on the garment are on a surface of the garment.

12. The smart garment of claim 11 wherein one of the pair of units is a mobile phone and the other unit of the pair is a headset.

13. The smart garment of claim 12 wherein the headset includes a microphone and an earphone.

14. The smart garment of claim 13 wherein each of the electrical connectors are one-half of a snap together type connector.

15. The smart garment of claim 14 wherein each unit of the electronic devices includes one-half of a snap together type connector electrically coupled to the unit.

16. The smart garment of claim 15 wherein male and female snap type electrical connectors are snapped together to form a snap button connector.

17. A smart garment for use with a wearable mobile phone and headset, the smart garment including in combination:

a plurality of garment locations adapted to store a mobile phone, a controller integrally secured to the garment and electrically connected via a network of conductive fibers to mobile phone electrical connectors secured to the garment at each of the garment locations, at least one headset electrical connector externally secured to the garment to provide an electrical connection to a headset, the headset electrical connector is electrically coupled to each of the mobile phone electrical connectors at each garment location via the controller, the controller functions as a logic circuit to allow a mobile phone electrical connector and a headset electrical connector to be interconnected when a mobile phone is connected to a mobile phone electrical connector and a headset is connected to a headset electrical connector.

18. The smart garment of claim 17 wherein the garment locations are conventional garment pockets.

19. The smart garment of claim 17 wherein the garment includes sleeves that have pockets that serve as garment locations.

20. The smart garment of claim 17 wherein the mobile phone electrical connectors and a headset electrical connector are of the snap type.

21. The smart garment of claim 17 wherein the controller is passive and through which all conductive fibers to mobile phone electrical connectors and the headset electrical connector are electrically coupled, the conductive fibers connecting the controller to the mobile phone connectors and a headset electrical connector forming a star like array.

22. The smart garment of claim 21 wherein the passive controller senses when a mobile phone connector is electrically connected to a mobile phone and when a headset electrical connector is electrically connected to a headset, to thereby provide an electrical path from the mobile phone to the headset.

23. A smart garment snap button connector for use with a communication system included in fabric of a smart garment, the snap button connector and communication system allow signals delivered to the snap button connector at a garment location to be faithfully conveyed by the system to another garment location, the snap button connector comprising:

a first portion and a mating second portion, the first portion having an overall external appearance of a decorative nature, the first portion is connectable to an information transmitting/receiving unit whereas the mating second portion of the snap button connector is simultaneously secured to the fabric of the garment and coupled to the communication system for the delivery of information from the transmitting/receiving unit via the mating first and second portions of the snap button to the other garment location.

24. The snap button connector of claim 23 wherein the overall external appearance of the first portion generally matches the external appearance of other garment buttons elsewhere on the garment.

25. The snap button connector of claim 23 wherein the first portion of the connector is also secured to the garment fabric such that when the first and second portions are in mating engagement the garment fabric secured to the first and second portions are physically coupled via the first and second portions of the snap button connector.

26. The snap button connector of claim 23 wherein the first portion of the snap button connector is of the female type and is comprised of a planar first pole element separated by a layer of insulation from a planar second pole element, the insulation and planar second pole element each having an opening there through coincident with each other to provide access to the planar first pole element and thereby create a female type connector.

27. The snap button connector of claim 23 wherein the second portion of the snap button connector is of the male type and is comprised of a perpendicularly disposed first pole element integral with a planar base, a collar of insulation surrounds the perpendicular first pole element and is integral with a layer of insulation that is contiguous with the planar base, the perpendicular first pole element and planar base are separated by the collar and layer of insulation from a second planar pole element that surrounds the perpendicular first pole element and its surrounding collar, the perpendicular first pole element and surrounding collar of insulation extends through and beyond the planar second pole element and then beyond the second planar pole element to thereby create a male type connector.

28. The snap button connector of claim 26 wherein the planar first pole element, layer of insulation and second planar pole element each have an overall shape of a disk.

29. The snap button connector of claim 27 wherein the planar base of the first pole element, the layer of insulation and the planar second pole element each have an overall shape of a disk.

30. The snap button connector of claim 28 wherein the disk shaped first pole element is provided with a decorative layer of material that generally matches the external appearance of other garment buttons elsewhere on the garment.

31. A smart garment system having wearable electronic devices of the type that include a pair of information transmitting/receiving units that are separately worn with the garment at different locations on the garment, the smart garment system including in combination:

a communications system included in fabric of the smart garment, snap button connectors having a first portion separable from a mating second portion, each garment location is provided with a second portion of a snap button connector, an information transmitting/receiving unit is connected to a first portion of a snap button connector, the second portion of the snap button connector at each location is simultaneously secured to the fabric of the garment and coupled to the communications system for delivery of information from a transmitting/receiving unit via a mating first and second portion of a snap button connector and the communications system to another unit secured to the communication system by a snap button connector at another garment location, the communications system includes a controller in signal communication with the second portion of a snap button connector at each of the different locations on the garment, each one of the pair of information transmitting units are connectable to anyone of the second portions of the snap button connector, the controller senses when a pair of information transmitting/receiving units are simultaneously coupled via a snap button connector at different locations to the communication system, the controller providing a signal path between the units for the simultaneous connection of the units to each other.

32. The smart garment system of claim 31 wherein the first portion of the snap connector has an overall external appearance that generally matches the external appearance of other buttons on the garment.

33. The smart garment system of claim 31 wherein the first portion of the snap button connector is also secured to the fabric such that when the first and second portions are in mating engagement the fabric secured to the first and second portions are physically coupled via the first and second portions of the snap button connector.

34. The smart garment system of claim 31 wherein the first portion of the snap button connector is of the female type and is comprised of a planar first pole element separated by a layer of insulation from a second planar pole element, the insulation and second planar pole element each having an opening there through coincident with each other to provide access to the planar first pole element and thereby create a female type connector.

35. The smart garment system of claim 31 wherein the second portion of the snap button connector is of the male type and is comprised of a perpendicularly disposed first pole element integral with a planar base, a collar of insulation surrounds the perpendicular first pole element and is integral with a layer of insulation that is contiguous with the planar base, the perpendicular first pole element and planar base are separated by the collar and layer of insulation from a second planar pole element that surrounds the perpendicular first pole element and surrounding collar, the perpendicular first pole element and surrounding collar of insulation extend through and beyond the planar second pole element to thereby create a male type connector.

36. The smart garment system claim 34 wherein the planar first pole element, layer of insulation and second planar pole element each have an overall shape of a disk.

37. The smart garment system of claim 35 wherein the planar base of the first pole element, the layer of insulation and the sector in planar pole element each have an overall shape of a disk.

38. The smart garment system of claim 36 wherein the disk shaped first pole element is provided with a decorative layer of material that generally matches the external appearance of other garment buttons elsewhere on the garment.

* * * * *